(12) United States Patent
Vartha et al.

(10) Patent No.: US 10,216,508 B1
(45) Date of Patent: Feb. 26, 2019

(54) SYSTEM AND METHOD FOR CONFIGURABLE SERVICES PLATFORM

(71) Applicant: Bank of America Corporation, Charlotte, NC (US)

(72) Inventors: Sai Srinivas Vartha, Hyderabad (IN); Sachin Teja Vadlamudi, Hyderabad (IN); Venu Polisetti, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/863,383

(22) Filed: Jan. 5, 2018

(51) Int. Cl.
  *G06F 9/44* (2018.01)
  *G06F 8/61* (2018.01)
  *H04L 29/06* (2006.01)
  *H04L 29/08* (2006.01)
  *G06Q 10/10* (2012.01)

(52) U.S. Cl.
  CPC .............. *G06F 8/64* (2013.01); *G06Q 10/10* (2013.01); *H04L 63/20* (2013.01); *H04L 67/26* (2013.01); *H04L 67/2842* (2013.01)

(58) Field of Classification Search
  None
  See application file for complete search history.

(56) References Cited

U.S. PATENT DOCUMENTS

| | | | |
|---|---|---|---|
| 8,112,537 B2 * | 2/2012 | Guenther | H04L 67/1095 709/203 |
| 8,290,908 B2 | 10/2012 | McCarthy et al. | |
| 8,572,602 B1 | 10/2013 | Colton et al. | |
| 9,703,801 B2 | 7/2017 | Melahn et al. | |

* cited by examiner

Primary Examiner — Qamrun Nahar
(74) Attorney, Agent, or Firm — Michael A. Springs

(57) ABSTRACT

A configurable services platform for software installation and management defines standard interfaces through which it connects to user portals for multiple client domains and multiple services or repositories that fulfill service requests submitted through the user portals. The platform includes a memory storing domain-specific configuration information, including indexing keys or filtering criteria supported in the service requests, and identifiers of services or repositories to which service requests submitted by users in respective client domains are routed. Platform administrators input changes to the configuration information, such as the addition of new keys, through an administrative portal. The changes are pushed to local caches for the user portals, services, and repositories and are consumed by code implementing the user portals, services, and repositories without modifying the code. New services or repositories are added by building connectors to the new services or repositories in accordance with the standard platform interfaces.

20 Claims, 6 Drawing Sheets

SYSTEM AND METHOD FOR CONFIGURABLE SERVICES PLATFORM

TECHNICAL FIELD

The present disclosure relates generally to computer architectures for software installation and management, and more particularly to systems and methods for implementing and operating a configurable services platform.

BACKGROUND

In conventional enterprise service provider systems that provide access to multiple services on behalf of clients, a user-facing portal for the system typically includes a hard-coded interface for each service that is associated with a given client. Each client typically defines its own set of attributes or filtering criteria for service requests directed to respective service associated with the client, some or all of which may be different than the attributes or filtering criteria for services requests directed to other services and/or for service requests directed to shared services by other clients. In these conventional systems, in order to on-board a new client and install software implementing an associated service, changes must be made to the program instructions that implement the user-facing portal (e.g., to support client-specific indexing keys in the interface presented to a user) and corresponding changes must be made in the program instructions that implement the service (e.g., to modify operations to use the client-specific indexing keys). Each time the program instructions for the user-facing portal and service are modified to on-board a new client and an associated service, the program instructions must be regression tested prior to installing the code into a production environment.

Conventional content management systems and services are sometimes used to manage the lifecycle operations of documents or other content stored in various repositories on behalf of service subscribers. Each of the repositories typically presents a different interface to users, based on the internal architecture of the underlying repository. For example, different user interfaces require a user to input different information into repository-specific user interface fields in order to retrieve and/or store content stored on their behalf in the repository or perform operations on that content. In these conventional systems, it is the responsibility of the client to create and submit service requests or queries using the information and format that is required by each repository in which content is stored on the client's behalf. In addition to service request and query interfaces being repository-specific, it is often the case that security mechanisms are different between the repositories supported by conventional content management systems. In these systems, it is the responsibility of the client to adhere to different security policies when accessing content stored in different repositories on their behalf.

The technical challenges resulting from the conventional service provider and content management systems described above include the need to modify tightly coupled program instructions for implementing user-facing portals and for implementing associated services or repositories each time a new client, service, or repository is on-boarded in these systems prior to installing the software in the system. This is especially challenging when the modifications involve a change to the attributes or filtering criteria that must be supported in the system due to any new client-specific requirements or changes to existing client-specific requirements. In these conventional systems, the modifications to the program instructions require not only a large engineering effort to make the changes to the code, but also require massive regression testing efforts. In addition, software management tasks, including the replication and maintainability of multiple versions of code, become increasingly complex in these systems as new clients, services, or repositories are brought on-board.

Thus, it is desirable to provide a solution that allows new clients, services, and/or repositories to be installed and that allows changes to be made to the attributes or filtering criteria supported in an enterprise service provider system that provides access to multiple services on behalf of multiple clients without the need to modify existing code for user-facing portals, services, or repositories of the system prior to installation.

SUMMARY

The technical challenges resulting from conventional service providers and content management systems include the need to modify tightly coupled program instructions for implementing user-facing portals and for implementing associated services or repositories each time a new client, service, or repository is on-boarded in these systems prior to installing the software in the system. This is especially challenging when the modification involves a change to the attributes or filtering criteria that must be supported in the system due to new or changing client-specific requirements. These changes require not only a large engineering effort to make the changes to the code, but also require massive regression testing efforts. In addition, software management tasks, including the replication and maintainability of multiple versions of code become increasingly complex as new clients, services, or repositories are brought on-board.

The system described in the present application provides a technical solution that enables new clients, services, and/or repositories to be brought on-board and that allows changes to be made to the attributes or filtering criteria supported in an enterprise service provider system that provides access to multiple services on behalf of multiple clients without the need to modify existing code for user-facing portals, services, or repositories of the system. In some embodiments, the system includes a configurable services platform through which the system can be expanded to include additional user-facing portals, services, and/or repositories or through which the configurations of existing user-facing portals, services, and/or repositories can be modified without needing to modify existing code.

The system allows service providers, including enterprise service providers, to meet service level agreements for providing access to multiple services on behalf of multiple clients in a cost effective way by decoupling client-specific attributes or filtering criteria from the program instructions that implement user-facing portals and platform-supported operations of multiple services and/or repositories. The system may record client-specific attributes, indexing keys, and filtering criteria, as well as other client-specific configuration information, in a configuration database. The configuration information may subsequently be retrieved from the configuration database to enable the dynamic reconfiguration of the portals, services, and/or repositories during operation based on any new or updated configuration information. In various embodiments, the configuration information stored in the configuration database may include, for each client, a respective set of supported attributes, metadata, indexing keys, and/or other filtering criteria to be presented to users through a user portal and/or used by a service or repository associated with the client to support client requirements. The client-specific configuration information may also include information identifying a target service and/or identifying a repository that stores (or is to store) content relevant to the client, information indicating whether the client should be on-boarded to a user portal, information indicating whether client validation is required, and/or a validation service to call, if so.

Because client-specific configuration information is abstracted away from the underlying program instructions that implement the user-facing portals, services, and repositories in the system, and is instead handled by the configurable services platform using the configuration database, there is no manual intervention in the code nor duplication of engineering effort required in order to install new clients, services, or repositories. For example, the installation of a new client in the system may require only that client-specific configuration information is added to the configuration database through an administration portal for the system. Configuration information, once added to the configuration database, may be automatically consumed by the code implementing the user-facing portals, services, and repositories during operation.

The technical challenges solved to develop the system described in this disclosure include a one-time engineering development effort to prepare the configurable services platform to support the expansion and modification of the user-facing portals, services, and repositories it supports on behalf of clients. For example, a configurable services platform may be built to connect to user-facing portals, services, and repositories in a modular fashion, and may provide a common interface to user-facing portals on the front end and a common interface to services and repositories on the back end. In some embodiments, the configurable services platform may be implemented using program instructions written in a markup language, e.g., using Extensible Markup Language (XML) based programming. When initially building the configurable services platform to include particular services and/or repositories, or when expanding the platform by adding a service or repository, rather than having to modify the code for the service or repository itself, a connector between the configurable services platform and the service or repository may be built based on the definition of the common interface and on client-specific configuration information associated with the service or repository. In some embodiments, the connector may be built automatically by program instructions within the configurable services platform.

In operation, the configurable services platform may, based on an identifier of a client on whose behalf of a service request is submitted and configuration information for that client stored in the configuration database, determine the operations that need to be invoked in response to the service request and the required properties for performing those operations. Based on this determination, a corresponding repository/service-specific request will be routed to the appropriate repository or service through a respective platform connector after which a response will be returned through the respective platform connector. In some embodiments, the service request may include a request for the performance of a web service operation, a query, or a request to retrieve a document or other client content from a repository associated with the client. In some embodiments, and dependent on the particular service request that was submitted, the response may include a requested document or other client content that is retrieved from a target repository associated with the client, metadata returned from a query, or results of another type of operation performed by a target service associated with the client. The configurable services platform may, based on the configuration information for the client stored in the configuration database, prepare the response to be returned to the client in a way that is presentable in the user portal through which the service request was received. Because the configurable services platform is able to determine and use different attributes, filtering criteria, and other configuration information for different clients, their content stored in a repository in the system and/or their service request requirements, the underlying code for these functions does not need to be modified repeatedly for different clients. In addition, the clients are not required to know the implementation details of the repositories and services in order to submit service requests targeting them.

Other technical advantages of the system described in this disclosure include, in at least some embodiments, the ability to scale the system both horizontally and vertically. For example, in some embodiments, platform-supported operations provided by one back end service or repository may be concurrently accessed by multiple clients having different front end requirements, and as the platform is expanded to include new services or repositories in the back end, they may be made available to multiple new or existing clients through the platform. Conversely, a single client may need to concurrently connect to multiple services or repositories to perform different operations and/or to access different documents or other client content that are stored in repositories that implement different storage technologies and/or access protocols.

In one embodiment, a disclosed system may include one or more computers that collectively implement multiple services on behalf of users in one or more client domains. For example, the computers may include processors and memory storing program instructions executable to implement the services. In some embodiments, the services may include one or more repositories configured to store content on behalf of users in various client domain. The system may also include a configurable services platform coupled to the computers. The configurable services platform may include a memory storing respective configuration information associated with each of the client domains. For example, the configuration information may be stored in a database within the memory. The configuration information may include, for each client domain, information defining an indexing key, a configuration attribute, and/or filtering criteria associated with service requests submitted on behalf of users in the client domain and targeting at least one of the services. The configurable services platform may also include a service request processor configured to process service requests received on behalf of the users in the client domains and targeting respective ones of the services based on the configuration information stored in the memory. Processing a service request may include generating operation data representing the service request that is specific to the client domain, the requested operation, and targeted service, and routing the operation data to the targeted service.

The configurable services platform may also include a platform administration portal coupled to the configurable services platform and configured to present a user interface through which configuration information associated with each of the client domains is input to the system by a platform administrator, and to receive, through the user interface, input indicating a requested change in the configuration information associated with a given one of the client domains. In some embodiments, the requested change in the configuration information may include the addition of a new indexing key or new filtering criteria to be supported in service requests submitted on behalf of users in the given client domain. The configurable services platform may further include a configuration object builder configured to create a configuration object including updated configuration information associated with the given client domain, where the updated configuration information reflects the requested change. The configurable services platform may be further configured to push the configuration object to an application cache accessible by a given one of the services targeted by the service requests submitted on behalf of users in the given client domain, after which the given service may be configured to apply the configuration object in fulfilling the service requests submitted on behalf of users in the given client domain without modification of the program instructions that are executable to implement the given service.

In some embodiments, the system may further include a user portal through which users in the given client domain submit service requests. The user portal may present user interface elements for specifying values for an indexing key or filtering criteria defined in the configuration information stored in the memory and associated with the given client domain. The configurable services platform may be further configured to push the configuration object to an application cache accessible by the user portal, after which the user portal may be configured to apply the configuration object pushed to the application cache accessible to the presentation of the user interface elements without a modification of program instructions executable to implement the user portal. The configurable services platform may be configured to push configuration objects to the application cache accessible by the given service and to the application cache accessible by the user portal on a predetermined schedule or at predetermined intervals (e.g., once every twenty-four hours).

In some embodiments, the configurable services platform may be communicatively coupled to each of the services through a predefined interface implemented in a connector between the configurable services platform and the service. In response to receiving, through the platform administration portal, input indicating a request to add a new service, the configurable services platform may build a new connector between the configurable services platform and the new service in accordance with the predefined interface, and establish communication with the new service through the new connector.

In some embodiments, in response to receiving, through a user-facing portal for users in a given client domain, a service request targeting a repository, a service request router may route the service request to the repository. An attribute defined in the configuration information stored in the memory and associated with the given client domain may identify the repository that stores content on behalf of users in the given client domain. In some embodiments, the service request may include a request to perform a query on content stored in the repository on behalf of users in the given client domain or a request to retrieve content stored in the repository on behalf of users in the given client domain. The configuration information stored in the memory and associated with the given client domain may include an indexing key usable to access a particular content element within the content stored in the repository on behalf of users in the given client domain or filtering criteria usable to identify a portion of the content stored in the repository on behalf of users in the given client domain on which an operation specified in the service request is to be performed. In some embodiments, the service request may specify a lifecycle operation to be performed on a particular content element within the content stored in the repository on behalf of users in the given client domain.

In one embodiment, a disclosed method may include presenting a user interface through which respective configuration information associated with each of one or more client domains is defined. The configuration information may include, for each client domain, information defining an indexing key, a configuration attribute, and/or filtering criteria associated with service requests submitted to a configurable services platform on behalf of users in the client domain and targeting at least one of multiple services accessible through the configurable services platform. The method may include storing, in a memory (e.g., in database), the respective configuration information associated with each of the one or more client domains. The method may also include processing, by the configurable services platform, service requests received on behalf of the users in the client domains and targeting respective services based on the configuration information stored in the memory. Processing the service requests may include routing the service requests to the targeted services. The method may include receiving, through the user interface, input indicating a requested change in the configuration information associated with a given client domain, creating a configuration object including updated configuration information associated with the given client domain, and pushing the configuration object to an application cache accessible by a given service targeted by service requests submitted on behalf of users in the given client domain. The updated configuration information may reflect the requested change. The method may also include the given service applying the configuration object in fulfilling the service requests submitted on behalf of users in the given client domain without a modification of program instructions executable to implement the given service.

In some embodiments, the method may also include pushing the configuration object to an application cache accessible by a user portal through which users in the given client domain submit service requests to the configurable services platform, and the user portal populating user interface elements presented by the user portal in accordance with an indexing key or filtering criteria defined in the configuration information without a modification of program instructions executable to implement the user portal.

In some embodiments, the configurable services platform is communicatively coupled to each of the services through a predefined interface implemented in a connector between the configurable services platform and the service, and the method may further include receiving input indicating a request to add a new service, and in response to receiving the request to add the new service, building a new connector between the configurable services platform and the new service in accordance with the predefined interface, and establishing communication with the new service through the new connector.

In some embodiments, the requested change in the configuration information includes the addition of a new indexing key or new filtering criteria to be supported in service requests submitted on behalf of users in the given client domain.

In some embodiments, the services include a repository configured to store content on behalf of users in the given client domain, and the method may further include receiving, on behalf of a user in the given client domain, a service request targeting the repository and routing the service request to the repository. The service request may include a request to perform a query on content stored in the repository on behalf of users in the given client domain, a request to retrieve content stored in the repository on behalf of users in the given client domain, or a request to perform a lifecycle operation on content within the content stored in the repository on behalf of users in the given client domain. The configuration information may include an indexing key usable to locate the content on which the service request is to be performed or filtering criteria usable to identify a particular content element on which the service request is to be performed.

The problems associated with enterprise service provider systems are problems necessarily rooted in computer technologies. In conventional enterprise service provider systems that include hard-coded interfaces between services and user-facing portals through which clients access those services, the tightly-coupled code implementing the services and portals must be modified and extensively regression tested each time a new client, service, or repository is installed in the system or in order to make changes in client-specific configuration information that affects the way the portals and/or services operate. As described in detail throughout this disclosure, by using a configuration database to decouple client-specific configuration information from the program instructions that implement services and user-facing portals, a disclosed configurable services platform provides a technical solution that addresses the problems associated with the creation, maintenance, and expansion of a conventional enterprise service provider system, and the capability (or lack thereof) of the system to incorporate changes to client-specific configurations in a timely and efficient manner without repeatedly duplicating the engineering effort required to create and maintain the underlying software of the enterprise service provider system.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system and methods described in the present application may enable the installation of clients, services, and/or repositories in an enterprise service provider system and may allow changes to be made to client-specific attributes or filtering criteria supported in the system without the need to modify existing code for user-facing portals, services, or repositories in the system. For example, a configurable services platform may be implemented in any organization or enterprise environment in which there are multiple systems with which users in different functional organizations or lines of business (each of which may have different requirements and/or parameters for performing platform-supported operations) wish to interact without having to know the internal details of the systems. The configurable services platform may use a configuration database to decouple client-specific configuration information from the code that that implements user portals, services, or repositories. Changes made to the configuration database through a platform administration portal may be automatically pushed to, and subsequently consumed by, the client-specific user portals, services, or repositories.

Figure 1A:
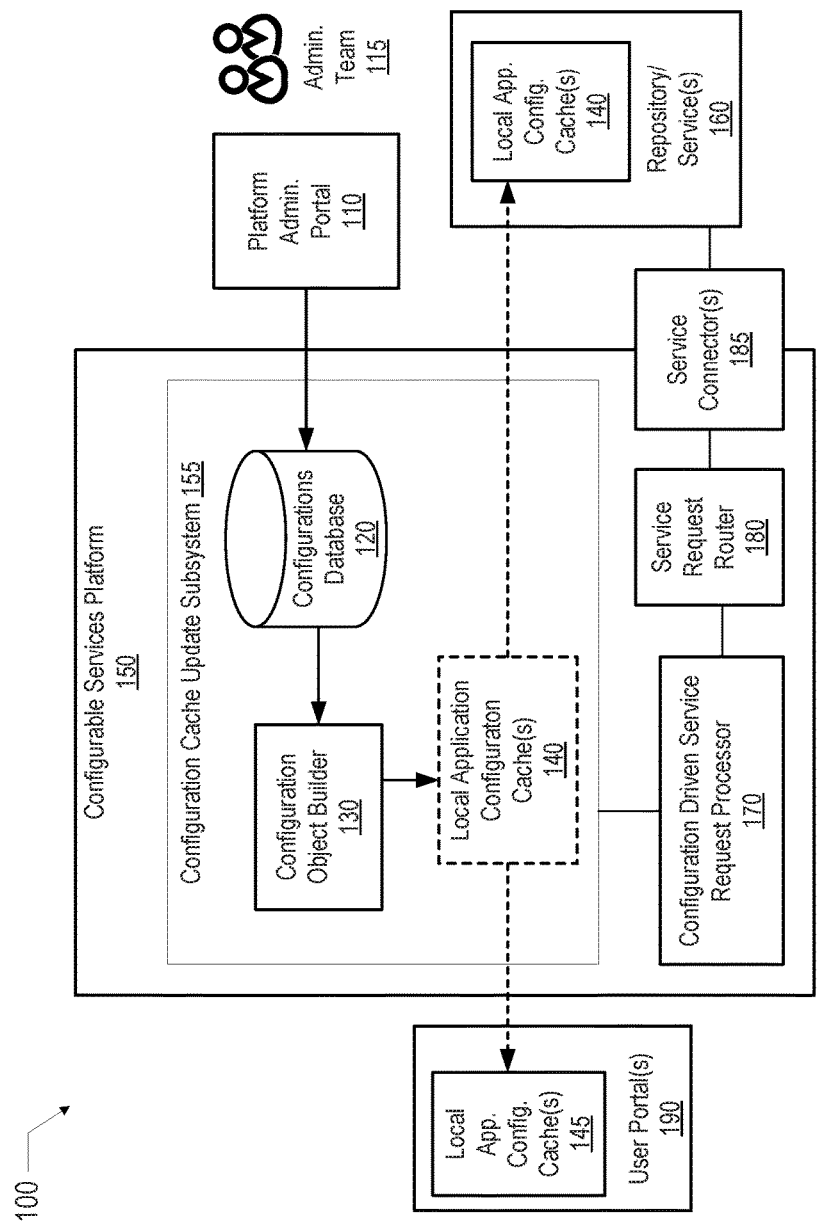
FIGS. 1A and 1B are schematic diagrams of an embodiment of a system for installing and managing service software.
Figure 1B:
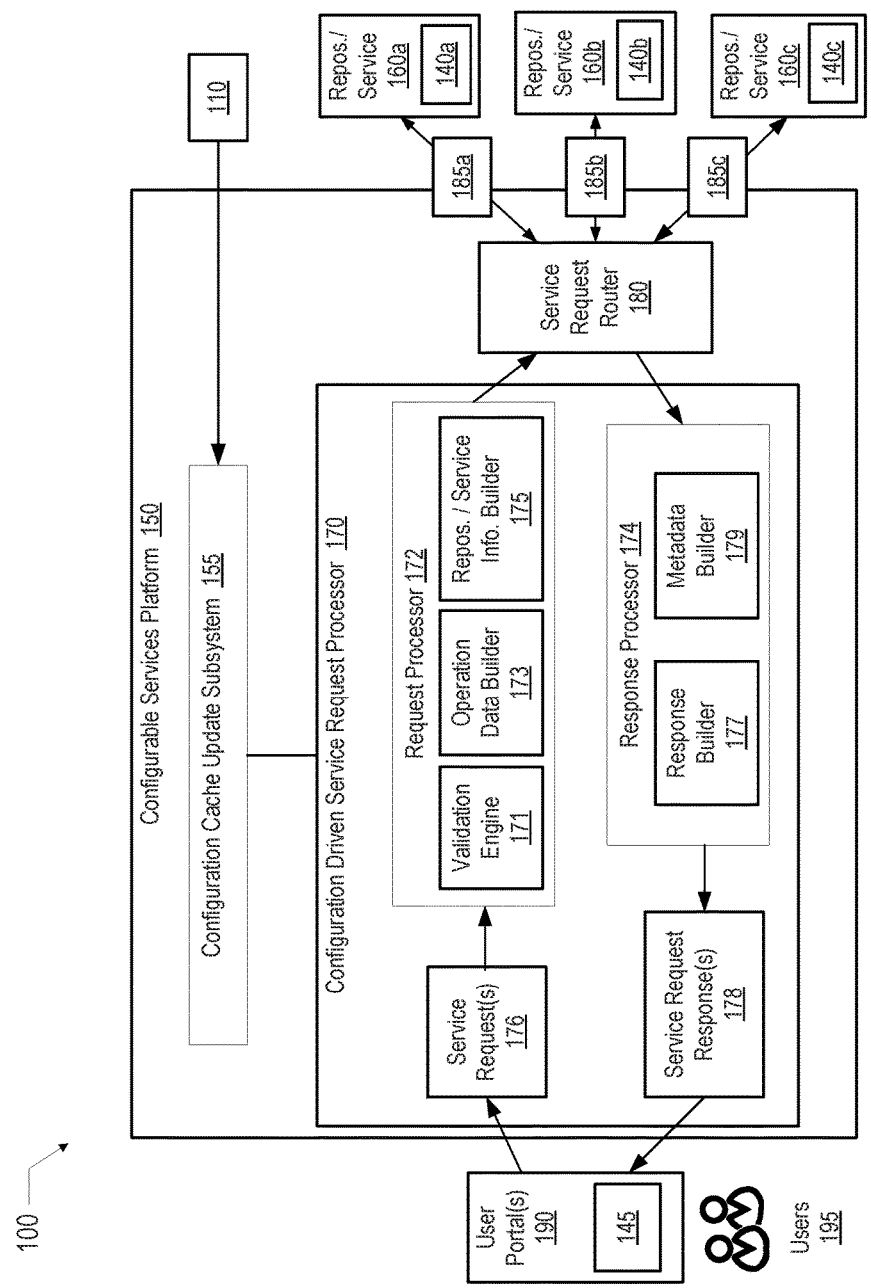

FIGS. 1A and 1B are schematic diagrams of an embodiment of a system for installing and managing service software. In the illustrated embodiment, system 100 includes configurable services platform 150, one or more user portals 190, a platform administration portal 110, and multiple services 160 (which may include one or more repositories and/or other web services). In some embodiments, configurable services platform 150 includes a configuration cache update subsystem 155, a configuration driven service request processor 170, and a service request router. Each user portal 190 may include, or have access to, a respective local application configuration cache 145. Similarly, each of the multiple repositories or services 160 may include, or have access to, a respective local application configuration cache 140.

In system 100, client-domain-specific configuration information, including definitions of indexing keys or other filtering criteria to be supported in requests to perform platform-supported operations in the context of client-domain-specific target repositories or services 160, is abstracted away from the program instructions that implement those services or repositories and the user portals 190 through which the requests are provided to them. As described in more detail below, platform-supported operations of the services 160 are executed based on the configuration information data maintained in configuration database 120. In some embodiments, service requests specifying the same operation but submitted on behalf of users in different client domains may to routed to different repositories or services 160 based on the client-domain-specific configuration information stored in configuration database 120. In some embodiments, the platform-supported operations specified in various service requests may include queries on client content stored in a repository, requests to retrieve content from a repository, lifecycle operations to be performed on client-domain-specific documents or other client content, such as annotations or versioning, or other types of web service operations. Interactions between the portals 190 and the services or repositories that perform the platform-supported operations are handled by the configurable services platform 150 in accordance with client-domain-specific configuration information maintained by platform 150 on behalf of multiple client domains.

Elements of system 100 involved in configuring and reconfiguring portals and services managed by configurable services platform 150 are described below in reference to FIG. 1A. Elements of system 100 involved in service request processing by configurable services platform 150 are described below in reference to FIG. 1B.

Turning now to FIG. 1A, in some embodiments, platform administration portal 110 may be configured to receive, from one or more members of a platform administration team 115, input defining configuration information that is specific to a particular client domain on whose behalf configurable services platform 150 brokers the fulfillment of service requests targeting a particular repository or service 160. In some embodiments, configurable services platform 150 may broker the fulfillment of service requests on behalf of users associated with any of multiple client domains. In some embodiments, a configurable services platform 150 operated by, or for the benefit of, a large enterprise may broker the fulfillment of service requests on behalf of multiple functional organizations or lines of business, each of which may be considered a different client domain. These client domains may have different requirements and/or parameters for performing platform-supported operations, including one or more of the same operations, on client-domain-specific content. In one non-limiting example, the client domains supported on behalf of a large enterprise may include a customer service domain, a legal services domain, and a transaction-processing domain within the enterprise. In some embodiments, the client domains supported on behalf of an organization may include client domains that are internal to the organization and client domains that are external to the organization (e.g., customer or subscriber domains).

Users acting within the content of different client domains may submit service requests associated with client-domain-specific documents or other client-domain-specific content for which configurable services platform 150 manages queries, search and retrieval of content and/or lifecycle operations targeting various repositories or services 160. In one example, users acting within the content of different client domains may submit service requests to perform platform-supported operations on different types of documents (e.g., contracts, marketing information, transaction-related documents, legal documents, health records, or customer data) which are stored in respective repositories on behalf of users in those client domains.

In some embodiments, client-domain-specific configuration information may include a respective set of supported attributes, metadata, indexing keys, and/or other filtering criteria to be presented to users through a user portal and/or used by a service or repository associated with the client domain to support client requirements. The client-domain-specific configuration information may also include information identifying a target service and/or identifying a repository that stores (or is to store) content relative to the client domain, information indicating whether the client should be on-boarded to a user portal, information indicating whether client validation is required, and/or a validation service to call, if so. In some embodiments, users of platform administration portal 110 (e.g., members of platform administration team 115) may enter inputs defining the configuration information for a new client domain to be supported by system 100. In some embodiments, users of platform administration portal 110 may enter inputs modifying the configuration information for a client domain that is currently supported by system 100 (e.g., to add a new indexing key). For example, an administrator of system 100, e.g., a member of administration team 115, may, from time to time, be asked to add a new indexing key to the configurable services platform for the benefit of users in a particular client domain.

In some embodiments, a user interface presented by platform administration portal 110 may be a graphical user interface (GUI) through which a member of administrator administration team 115 may populate specific user interface elements or fields to define or modify client-domain-specific configuration information. For example, when adding a new key to be supported in system 100, the administration team member may be presented with user interface elements (e.g., pull-down menus, text boxes, or other user interface elements) through which to specify the primary client domain associated with the new key, the name of the new key, a description of the new key, the key length (e.g., the maximum number of alphanumeric characters allowed in the key value), one or more other participating client domain, an indication of whether or not the new key is searchable, and/or an indication of whether or not the key can be validated. In some embodiments, a new key may be defined by a customer or service subscriber based on a client-domain-specific usage model. In some embodiments, a new key may be defined by a member of the administration team 115 to support internal operations of the enterprise and/or system 100.

In some embodiments, after inputs defining new or modified configuration information for a given client domain are received through platform administration portal 110, they may be automatically incorporated into the appropriate user portal 190 and repository or service 160 without the need to modify the program instructions that implement the user portal and the repository or service 160. For example, in some embodiments, configuration cache update subsystem 155 includes a configurations database 120 and a configuration object builder 130. When inputs defining the client-domain-specific configuration information are received, the client-domain-specific configuration information may be stored in configuration database 120. Subsequently, configuration object builder 130 may read the client-domain-specific configuration information from configuration database 120. Configuration object builder 130 may build configuration objects understandable by the program code that implements the user portal 190 and repository or service 160 (e.g., Java™ objects), after which the configuration objects may be pushed to, or otherwise synchronized with, configuration objects stored in respective local application configuration caches 145 and 140 within the appropriate portal 190 and the appropriate repository or service 160, respectively. In some embodiments, this refreshing of the local application configuration caches 145 and 140 with configuration database 120 may occur on a predetermined schedule or at predetermined intervals. For example, in one embodiment, local application configuration caches 145 and 140 may be synchronized with configuration database 120 once every twenty-four hours (e.g., overnight).

Following the synchronization, the interfaces presented to users through the user portal 190 (e.g., graphical user interface screens, pull-down menus, etc.) may be automatically repopulated based on the refreshed contents of the local application configuration cache 145. For example, a user portal 190 may use the configuration in its local application configuration cache 145 to build a list of JavaScript Object Notation (JSON) based templates each pertaining to one client domain. In some embodiments, each JSON template may include a user interface layout, a list of indexing keys and/or filtering criteria that should be presented through the user portal 190, and a list of platform-supported operations which the user portal 190 is to present as options to users in that client domain. For any given client, the information presented to the users and the manner in which the information is presented in the user portal 190 may depend on a JSON template that is derived from the client-domain-specific configuration information associated with the client domain and stored in configuration database 120.

In some embodiments, following the synchronization of local caches 140 with configuration database 120, the certain aspects of the associated repositories or services 160 may change dynamically in accordance with the altered client-domain-specific configuration information. For example, a change in the client-domain-specific configuration information may include a change in the service to be called or in the repository from which to fetch client content and/or into which to client content should be injected or updated for users in a given client domain. By altering the configuration information for a specific client domain, for example, the underlying repositories or services 160 targeted by service requests submitted by users in a given client domain may be changed. In another example, the client-domain-specific information may include validation information indicating whether client validation is required, and/or a validation service to call, if so. By altering this information, the same or different validation services may be called on behalf of service requests submitted by users in different client domains. In some embodiments, various repositories or services 160 may have different security requirements, such as identity and authentication requirements. These requirements may be used to determine whether given users (or all users in a given client domain) are authorized to consume a particular service, to access a particular repository, to perform a particular subset of the platform-supported operations, or to perform all platform-supported operations. In some embodiments, service requests may be verified with respect to these security requirements up front (e.g., within the user portal 190 or at any point before the service requests are submitted to configuration services platform 150). In other embodiments, service requests may be verified with respect to these security requirements in the back end (e.g., after being routed to a particular repository or service 160).

In various embodiments, the decoupling of client-domain-specific configuration information from the code that implements user portals 190 and repositories or services 160 may allow system 100 to be expanded horizontally or vertically without the need for significant re-coding or regression testing efforts.

In some embodiments, a user portal 190 may be configured to receive service requests through client-domain-specific templates generated by the portal 190 based on configuration information found in its local application configuration cache 145, and pass the service requests to configuration driven service request processor 170 for processing. For example, any or all platform-supported operations of multiple repositories or services 160 may be invoked through user portal 190. However, not all users may be presented with all possible platform-supported operations, depending on the client-domain-specific templates presented to them through a respective user portal 190.

Various elements of configuration driven service request processor 170 are illustrated in FIG. 1B. These elements and service request router 180 are described below in reference to FIG. 1B. For example, in the illustrated embodiment, configuration driven service request processor 170 includes a request processor 172 configured to receive service requests 176 on behalf of users 195, process those requests for compatibility with the platform-supported operations and/or target repositories or services 160, and send the processed requests to service request router 180. In some embodiments, service requests 176 may include requests to perform queries on client content stored in a repository, requests to retrieve content from a repository, requests to perform lifecycle operations on client-domain-specific documents or other client content, such as annotations or versioning, or requests to perform other types of web service operations, some or all of which may support the use of client-domain-specific attributes, metadata, indexing keys, and/or other filtering criteria. In some embodiments, if any particular attributes, metadata, indexing keys, and/or other filtering criteria are required to be specified in a given service request 176, the user submitting the request may be prompted to enter the information in a client-domain-specific template presented to the user (e.g., in a GUI) by user portal 190. In some embodiments, a user submitting a service request may specify the client domain context for the service request through a GUI presented by user portal 190, and may present the appropriate client-domain-specific template to the user. In some embodiments, user portal 190 may be configured to determine the client domain context based on an identifier of the user who is submitting the service request, and may present the appropriate client-domain-specific template to the user.

In the illustrated embodiment, configuration driven service request processor 170 also includes validation engine 171, operation data builder 173, and repository and/or service information builder 175. Validation engine 171 may be configured to determine the client domain context of each incoming service request and, based on the client-domain-specific configuration information stored in configuration database 120, determine whether the service request is to be validated and the validation service to be called, if so. If the service request is to be validated, validation engine 171 may call the appropriate validation service and, if the service request is validated, may send the validated services request to operation data builder 173.

In some embodiments, operation data builder 173 may be configured to determine the platform-supported operation (or operations) to be performed in order to fulfill the service request based on the type of data to be operated on and/or attributes specified in the client-domain-specific configuration information stored in configuration database 120. For example, operation data builder 173 may reframe the service request in terms of the determined platform-supported operation (or operations). Repository and/or service information builder 175 may, based on the client-domain-specific configuration information stored in configuration database 120, determine the repository or service 160 to which the service request should be routed. For example, documents and other client content stored in different repositories may be stored using different storage schema, different storage technologies and/or different access protocols that affect the required elements of the service requests routed to the repository or service. In some embodiments, repository and/or service information builder 175 may be configured to gather and apply information regarding client-domain-specific data object or document classes, and/or session specifications for the client domain. In some embodiments, repository and/or service information builder 175 may be configured to process the service request to include the required elements, after which repository and/or service information builder 175 may pass the processed service request to service request router 180. Service request router 180 may receive the processed service request and, based on the operation data and the repository and/or service information for the service request, route it, through the appropriate connector 185, to the targeted repository or service

160. In some embodiments, service request router 180 may establish connectivity to the targeted repository or service 160 to fulfill the service request. In one example, service request router 180 may call an operation of the target repository or service, where the call includes the operation data and the repository and/or service information for the service request.

As illustrated in FIG. 1B, configuration services platform 150 is communicatively coupled to each of the repositories or services 160 through a respective connector 185. In some embodiments, each connector 185 implements a predefined interface between configurable services platform 150 and the repositories/services 160.

In the illustrated example, system 100 includes three repositories or services 160. Each of the elements 160 may provide web services and/or a repository in which domain-specific content is stored for the benefit of various users 195. Each of the elements 160 may include, or have access to, a respective local application configuration cache 140 that stores domain-specific configuration information for any client domains for which users in the client domain have access to the repository or service. For example, repository/service 160a includes local application configuration cache 140a, repository/service 160b includes local application configuration cache 140b, and repository/service 160c includes local application configuration cache 140c.

As noted above, in system 100, user portal 190 includes, or has access to, local application configuration cache 145. In some embodiments, user portal 190 may present (e.g., through a GUI) user interface elements for specifying values for client-domain-specific configuration information, including attributes, indexing keys, and filtering criteria, as well as other client-domain-specific configuration information defined in the configuration information stored in database 120 and associated with a given client domain. The information presented to users and the manner in which the information is presented in the user portal 190 may depend on a JSON template that is derived from the client-domain-specific configuration information associated with the client domain and stored in local application configuration cache 145. The template may include pull-down menus, text boxed, and/or other user interface elements through which various fields within the template may be populated.

In the illustrated embodiment, results of the operation or query are returned via service request router 180 and passed to response processor 174 for processing. For example, in some embodiments, the returned results for a service request 176 may include one or more documents or other client content, one or more outputs of a service function or other operation performed in response to the service request, or metadata associated with the service request or the response (e.g., metadata associated with documents or other client content).

In some embodiments, response processor 174 may be configured to receive the results returned by the target repository or service and process the results to place them in a format in which they will be returned to the requestor (e.g., for compatibility of user portal 190). For example, response processor 174 may include a metadata builder 179 and a response builder 177. Metadata builder 179 may be configured to consolidate and/or translate the metadata returned from the repository or service 160. For example, each repository or service 160 may return a different string of metadata (e.g., different repositories or services 160 may return strings of metadata including different information and/or information that is formatted differently within the different strings). Metadata builder 179 may be configured to map or translate the received metadata to format it in accordance with a common structure for metadata in system 100 or in configurable services platform 150. For example, metadata builder 179 may apply client-domain-specific logic for content retrieval operations (or a content retrieval invocation service) in accordance with specified file extensions or Multipurpose Internet Mail Extension (MIME) types. Response builder 177 may be configured to map and/or translate the returned results into an appropriate response format to be returned to the user through user portal 190, and to send the response to user portal 190 to be rendered in the portal. In some embodiments, response builder 177 may frame the response for the user based on the success or failure of a content retrieval operation (or content retrieval invocation service). In one example, response builder 177 may be configured to generate a client-understandable service request response 178 that includes the returned results and that can be returned to the requestor (through the user portal 190 from which the service request 176 was received) in accordance with service level agreements for responses.

In one example, a user in a given client domain may, through a GUI presented by user portal 190 select a document to view or retrieve by selecting the appropriate domain from a pull-down menu and typing in a key value with which to search for the document (e.g., a document ID value, or a key word contained in the document). After user portal 190 receives the input from the user, the input is sent to the configuration services platform, in the form of a service request 176, for processing. After processing, service request 176 is routed to a repository identified in client-domain-specific configuration information as the repository in which documents are stored on behalf of users in the given client domain. The repository, or another service, may perform a search for the selected document in the repository, e.g., by submitting a query to the repository including the specified document ID or key word to fetch the document and return it to the configurable services platform. The configurable services platform may process the document for return to the requestor, after which a service request response 178 may be returned to user portal 190. In this example, the unit of query may be a whole document. In another example, a user in a given client domain may, through a GUI presented by user portal 190 select client content to view or retrieve by selecting the appropriate domain from a pull-down menu and typing in, or otherwise selecting, filtering criteria with which to filter client content stored in the repository. For example, the filtering criteria may specify a version number for client content to be returned, an identifier of a state of the client content to be returned, or an indication of whether or not the client content to be returned has been signed or approved by a reviewer.

In some embodiments, each time a user provides input specifying an operation to be performed through a user portal, the configurable services platform may process the inputs as a service request and call one or more operations of a repository or service in order to fulfill the service request, after which it may return the response. While several examples described in the present disclosure relate to document management and other content management operations, the system and its configurable services platform may be applied in other application contexts or in systems that includes content or document management services as well as other types of web services for which the configurable services platform can broker fulfillment of service requests on behalf of users in multiple client domains.

FIGS. 1A and 1B illustrate an example embodiment of a system configured to implement a configurable services platform that includes the illustrated components. In other embodiments, a system configured to implement a configurable services platform may include more, fewer, or different elements than those illustrated in FIGS. 1A and 1B. In addition, functionality described as being implemented by a specific element in system 100 may be implemented by one or more other elements in other embodiments, or the collective functionality of system 100 may be distributed between elements differently than as illustrated in FIGS. 1A and 1B.

Figure 2:
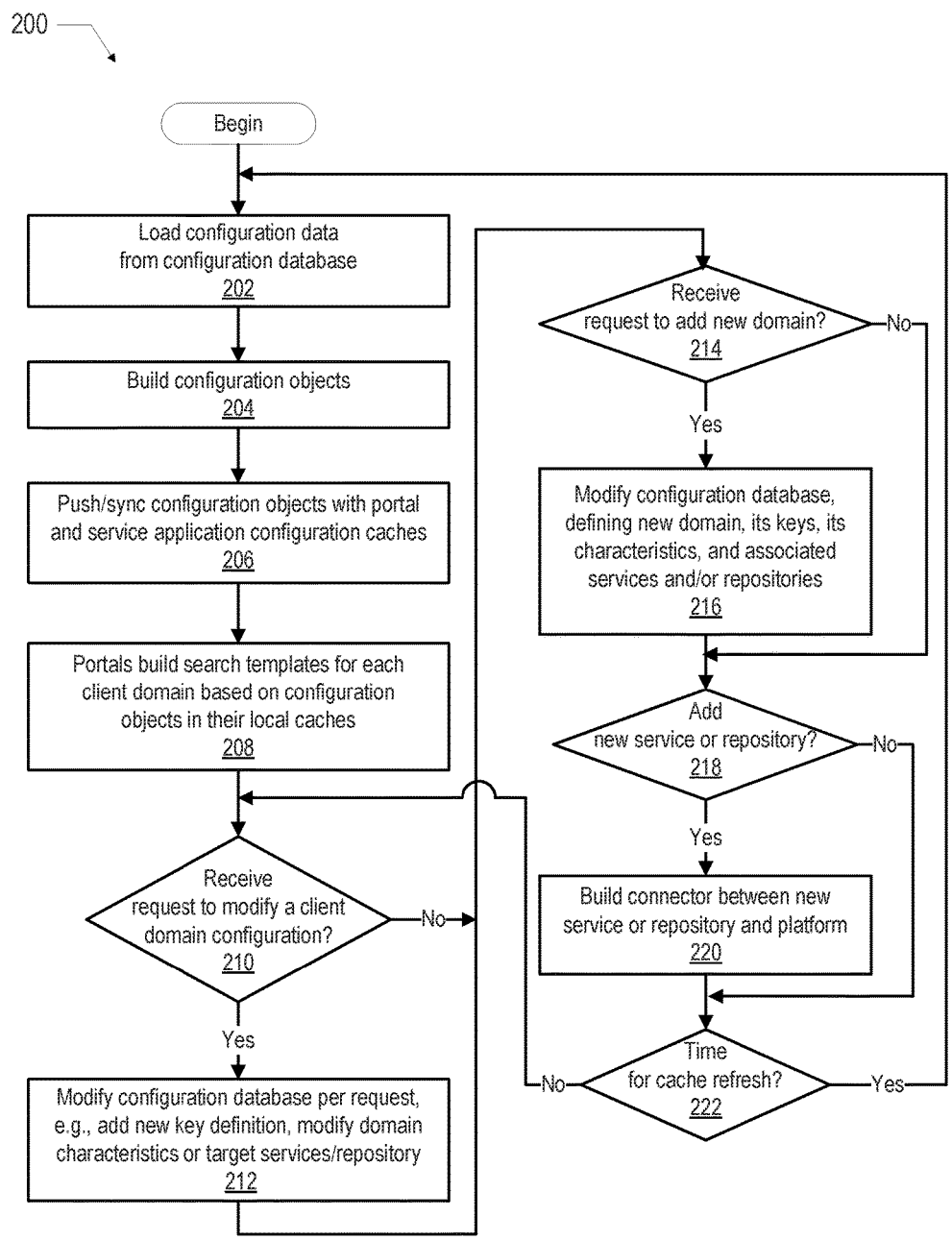
FIG. 2 is a flowchart of an embodiment of a method for configuring and reconfiguring portals and services managed by a configurable services platform.

FIG. 2 is a flowchart of an embodiment of a method 200 for configuring and reconfiguring portals and services managed by a configurable services platform, such as configurable services platform 150 illustrated in FIGS. 1A and 1B. In particular embodiments, some or all of the operations of method 200 may be performed by configuration cache update system 155.

Method 200 begins and, at 202, includes loading configuration data from a configuration database, such as configuration database 120 illustrated in FIG. 1A. In particular embodiments, configuration loaded from the configuration database when the configurable services platform is started up or when a user portal (such as a user portal 190) or a service (such as a repository or web service 160) starts up.

At 204, the method may include building configuration objects from the loaded configuration data. In some embodiments, the configuration objects may be Java objects that are understandable by the user portals and services with which they will be shared.

At 206, the configuration objects may be pushed to and/or synchronized with local application configuration caches 145 and 140 associated with the user portals 190 and repositories/services 160, respectively. For example, the newly generated configuration objects may be synchronized with configuration objects previously pushed to local application configuration caches 145 and 140 within the memory systems of the computer systems on which the portal and service applications are executing. In some embodiments, the operations shown as 202 through 206 may be repeated periodically (e.g., at a fixed interval) to refresh the application configuration caches with the most recently defined configuration information. For example, in some embodiments, the fixed interval may be twenty-four hours, and the local application configuration caches 145 and 140 may be refreshed at the same time each day (e.g., overnight).

At 208, method 200 may include the portal applications building search templates for each client domain based on the configuration objects in their local application configuration caches 145. This operation may establish the functionality of the portal as an interface through which services 160 can be accessed. In some embodiments, the search templates may be JSON-based templates that define the user interfaces through which queries, content retrievals, and other operations may be requested of various services 160. In some embodiments, for each client domain, the configuration objects, and corresponding search templates, may define a respective set of keys usable for indexing and/or filtering, as well as other characteristics of the corresponding client domain. The templates may define a user interface layout to be used when rendering a graphical user interface (GUI) that presents the client-specific keys and other selectable inputs for operations in the corresponding client domain. For example, the templates may define the number, type, arrangement, and content of multiple user interface elements (e.g., pull-down menus, text boxes, radio buttons, etc.) to be presented in the GUI through which users in the client domain enter inputs that define a service request.

In some embodiments, the templates may, collectively, reflect the hierarchical nature of the configuration information stored in configuration database 120. For example, some indexing keys or filtering criteria, and corresponding user interface elements, may be common across all templates, while other keys and/or filtering criteria may be specific to certain client domains or to client content for a specific client domain that is of a particular data types. The templates may also define rules, based on the client-domain-specific configuration information, for determining the target service or repository to which service requests submitted by users in certain client domains are to be routed for fulfillment.

If, at 210, a request to modify a client domain configuration is received, method 200 may proceed to 212. Otherwise, method 200 may proceed to 214. A request to modify a client domain configuration may include a request to add a search or indexing key, modify characteristics of a search/indexing key, add filtering criteria, modify filtering criteria, identify a different target repository or service to be associated with the client domain, or modify validation information associated with the client domain. At 212, method 200 may include modifying the configuration database in accordance with the received request, e.g., by adding new key definition, modifying an existing key definition, adding or modifying filtering criteria, changing the target repository or service associated with the client domain, modifying validation information associated with the client domain, or modifying another characteristic of the client domain.

If, at 214, a request to add a new client domain is received, method 200 may proceed to 216. Otherwise method 200 may proceed to 218. At 216, method 200 may include modifying the configuration database, including defining the new domain, its search/indexing keys, its filtering criteria, and/or other attributes and characteristics of the new domain, and the target services and/or repositories associated with the new client domain.

If, at 218, a request to add a new service or repository is received, method 200 may proceed to 220. Otherwise, method 200 may proceed to 222. At 220, method 200 may include building a connector between the new service or repository and the configurable services platform in accordance with a predefined platform interface standard, after which communication between the configurable service platform and the new service or repository may be established.

If, at 222 (or at any other time during the execution of method 200), it is determined that the local application configuration caches should be refreshed, method 200 may return to 202, at which point configuration data representing the most recent updates to configuration database 120 maybe loaded, the configuration data may be used to build updated configuration objects (at 204), and the configuration objects may be pushed to or synchronized with the local application configuration caches 145 and/or 140. For example, in some embodiments, the operations shown as 202 through 206 may be repeated automatically once every twenty-four hours to synchronize local application configuration caches 145 and/or 140 with the most recent updates to the configuration database 120.

In some embodiments, none of elements of the system, including the configurable services platform, the configuration database, the user portals, the platform administration portal, the services nor the repositories, need to be taken offline or out of service while an update to the local application configuration caches 145 and/or 140 is taking place. Instead, all elements may remain operational while the application configuration caches are being refreshed with the latest configuration information without disruption. The updated configuration information may be consumed by the code that implements the user portals, services, and repositories as soon as it has been refreshed in the respective local application configuration caches.

Particular embodiments may repeat one or more steps of method 200, where appropriate. Although this disclosure describes and illustrates particular steps of method 200 as occurring in a particular order, this disclosure contemplates any suitable steps of method 200 occurring in any suitable order. Moreover, although this disclosure describes and illustrates an example method for configuring and reconfiguring portals and services managed by a configurable services platform including the particular steps of method 200, this disclosure contemplates any suitable method for configuring and reconfiguring portals and services managed by a configurable services platform including any suitable steps, which may include all, some, or none of the steps of method 200, where appropriate. Furthermore, although this disclosure describes and illustrates particular components, devices, or systems carrying out particular steps of method 200, this disclosure contemplates any suitable combination of any suitable components, devices, or systems carrying out any suitable steps of method 200.

In some embodiments, after defining and/or modifying client-domain-specific configuration information through a platform administration portal, the configuration information may be exported to a configuration file and subsequently imported into by the same configurable services platform instance or by a different configurable services platform instance. For example, in some embodiments, client domain configurations may be defined and evaluated in a testing environment prior to being incorporated into a production environment. In another example, a configuration defined for one client domain may be imported, in whole or in part, for the benefit of another client domain, after which it might or might not be modified to cause the two configurations diverge. In some embodiments, a configuration file produced by exporting client-domain-specific configuration information may be an XML document in which the configuration information is broken down into multiple records, each defining a search or indexing key, filtering criteria, a target service or repository associated with the client domain, an indication of whether the client should be on-boarded to a user portal, validation information associated with the client domain, or any other configurable characteristics or attributes associated with the client domain.

In some embodiments, once a client domain has been configured for interaction with the configurable services platform, the platform may being to broker the fulfillment of services requests submitted by users in the client domain. At that point, if a user in the client domain enters input through a user portal for the client domain defining a query, a request to retrieve or store a document or other client content, or another type of service request, the user portal may submit the input as a service request to the configurable services platform, and they platform may process the request and route it to the appropriate service or repository, based on the current client-domain-specific configuration information.

Figure 3:
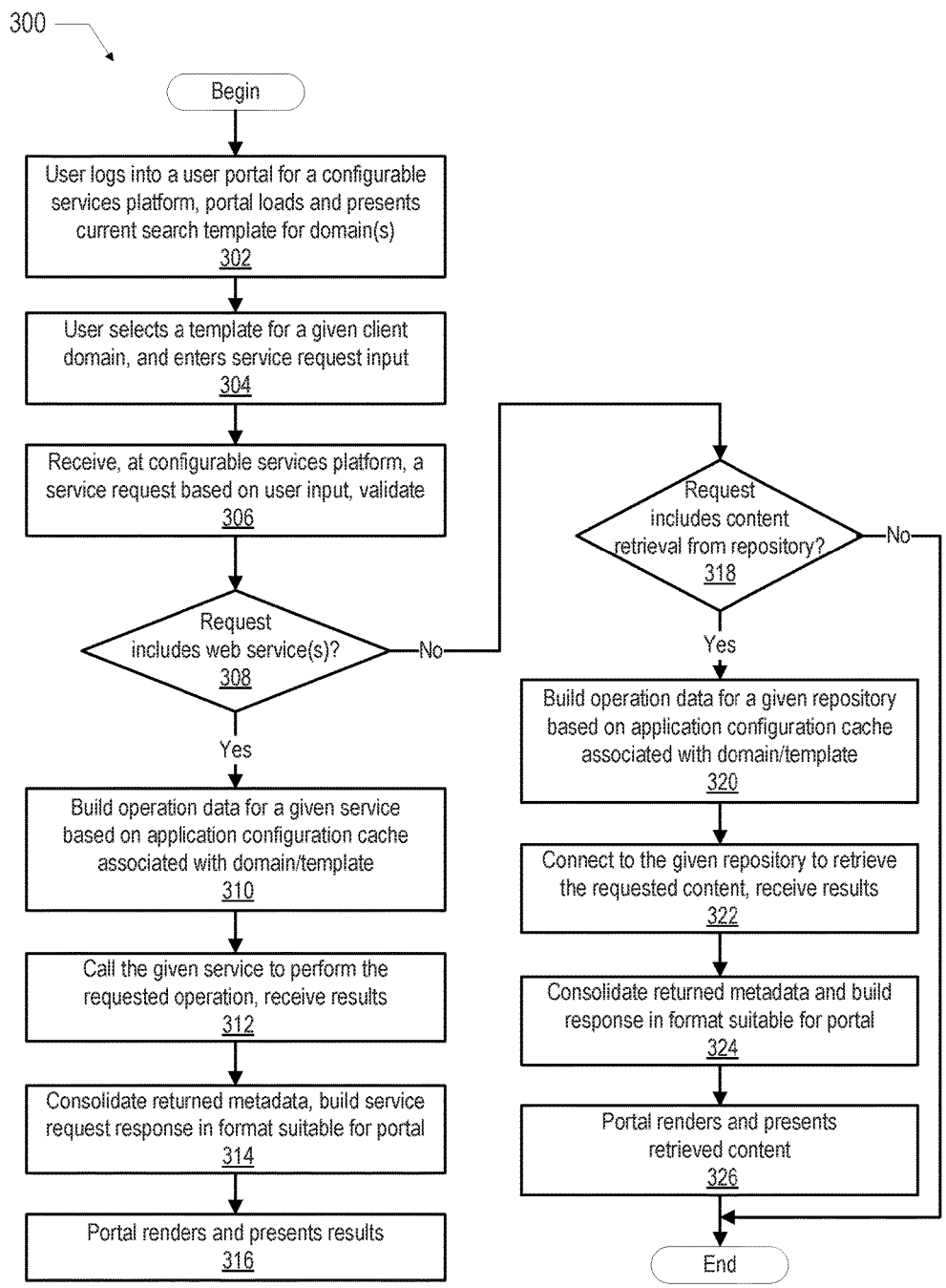
FIG. 3 is a flowchart of an embodiment of a method for service request processing by a configurable services platform.

FIG. 3 is a flowchart of an embodiment of a method 300 for service request processing by a configurable services platform, such as configurable services platform 150 illustrated in FIGS. 1A and 1B. In particular embodiments, some or all of the operations of method 300 may be performed by configuration driven service request processor 170. Method 300 begins and, at 302, a user may log into a user portal 190 for a configurable services platform 150. In response, the portal application may load and present a respective current search template for one or more client domains. In one example, the user portal may present the option to select one of two or more search templates, each of which is associated with a client domain in the context of which service requests may be submitted by the user submitting the service request. In another example, the user portal may select a search template to be presented to the user based on an identifier of the user and a known association between the user and a particular client domain.

At 304, method 300 may include the user selecting a template for a given client domain, and entering service request input defining a query, request to retrieve content, or other operation provided by a repository or service 160 managed by the configurable services platform 150.

At 306, method 300 may include receiving, at configurable services platform 150, a service request based on the user input and validating the service request. In particular embodiments, the service request may be subject to security requirements associated with the client domain, such as identity and authentication requirements. In some embodiments, the service request may be verified in according with such security requirement prior to being passed to configurable services platform 150.

If, at 308, it is determined that the service request includes a request for a web service operation, method 300 may proceed to 310. Otherwise, method 300 may proceed to 318. At 310, method 300 may include building operation data for the given service based on the application configuration cache associated with client domain and data entered in the corresponding search template.

At 312, method 300 may include calling the given service to perform the requested operation, and receiving the results. For example, the results may include one or more documents or other client content, one or more outputs of a service function or other operation performed in response to the service request, or metadata associated with the service request or the response (e.g., metadata associated with documents or other client content). At 314, the method may include consolidating any returned metadata and building a service request response in a format suitable for communicating the results though the user portal 190 through which the service request was received, as described above in reference to FIG. 1B. In some embodiments, the method may include producing a service request response that is compatible with a predefined platform-to-portal interface standard. At 316, method 300 may include the user portal 190 rendering and presenting the results (e.g., in a GUI of the portal application).

If, at 318, it is determined that the service request includes a request for content to be retrieved from a given target repository associated with the client domain, method 300 may proceed to 320. Otherwise, method 300 may end. For example, some service requests are directed to client content retrieval only. Other service requests may involve content modification or storage and/or may define other operations to be performed on retrieved client content. Thus, in some embodiments, the operations shown in FIG. 3 as 310 through 316 may be performed following the operations shown as 320 through 326 rather than prior to these operations.

At 320, method 300 may include building operation data for the given repository based on the application configuration cache associated with client domain and data entered in the corresponding search template. At 322, method 300 may include connecting to the given repository to retrieve the requested content and receiving the results (e.g., the requested content). In some embodiments the received results may include metadata associated with the requested client content.

At 324, the method may include may include consolidating any returned metadata and building a service request response in a format suitable for communicating the results though the user portal 190 through which the service request was received. building a service request response in a format suitable for communicating the results though the user portal 190 through which the service request was received, as described above in reference to FIG. 1B. In some embodiments, the method may include producing a service request response that is compatible with a predefined platform-to-portal interface standard. At 326, method 300 may include the user portal 190 rendering and presenting the retrieved content (e.g., in a GUI of the portal application), after which method 300 may end.

Particular embodiments may repeat one or more steps of method 300, where appropriate. Although this disclosure describes and illustrates particular steps of method 300 as occurring in a particular order, this disclosure contemplates any suitable steps of method 300 occurring in any suitable order. Moreover, although this disclosure describes and illustrates an example method for configuring and reconfiguring portals and services managed by a configurable services platform including the particular steps of method 300, this disclosure contemplates any suitable method for configuring and reconfiguring portals and services managed by a configurable services platform including any suitable steps, which may include all, some, or none of the steps of method 300, where appropriate. Furthermore, although this disclosure describes and illustrates particular components, devices, or systems carrying out particular steps of method 300, this disclosure contemplates any suitable combination of any suitable components, devices, or systems carrying out any suitable steps of method 300.

Figure 4:
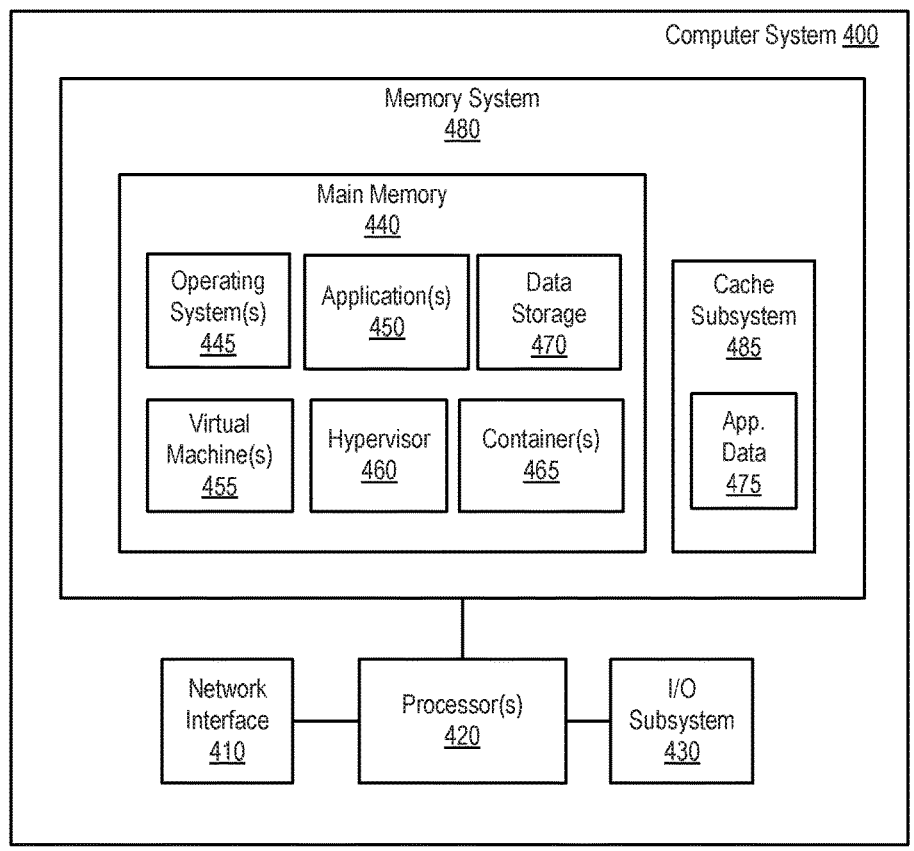
FIG. 4 illustrates an example of a computer system, according to one or more embodiments.

Turning now to FIG. 4, an example of a computer system 400 is illustrated, according to one or more embodiments. As shown, a computer system 400 may include one or more processors 420, a memory system 480, a network interface 410, and an input/output (I/O) subsystem 430. As illustrated, memory system 480, network interface 410, and I/O subsystem 430 may be communicatively coupled to processor 420. Memory system 480 may include a main memory 440 and a cache subsystem 485. In various embodiments, cache subsystem 485 may, depending on the architecture of the computer system on which cache subsystem 485 resides, include a single cache that is internal to a processor 420 or multiple levels of internal cache, some of which are accessible by multiple processors 420. In another embodiment, cache subsystem 485 may reside external to processors 420 or may include a combination of both internal and external caches depending on the particular implementation and needs. In some embodiments, cache subsystem 485 may be configured to store, at least temporarily, application data 475. For example, cache subsystem 485 may include a local application configuration cache for a user portal, repository, or service in which client-domain-specific configuration objects and any other configurable parameters of a configurable services platform 150 implemented on one or more computer systems 400 are, at least temporarily, stored. Main memory 440 and cache subsystem 485 may be implemented using any suitable type of memory medium, in various embodiments.

In one or more embodiments, the term "memory medium" may mean a "memory device", a "memory", a "storage device", a "tangible computer readable storage medium", and/or a "computer-readable medium". In one example, main memory 440 and/or cache subsystem 485 may be or include a volatile memory medium. For instance, the volatile memory medium may lose stored data when the volatile memory medium no longer receives power. In a second example, main memory 440 and/or cache subsystem 485 may be or include a non-volatile memory medium. For instance, the non-volatile memory medium may not lose stored data when the volatile memory medium no longer receives power or when power is not applied. In another example, main memory 440 and/or cache subsystem 485 may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

As shown, main memory 440 may include one or more operating systems 445, one or more applications 450, one or more virtual machines 455, a hypervisor 460, and one or more containers 465. In other embodiments, main memory 440 may include more, fewer, or different elements than those illustrated in FIG. 4. In some embodiments, one or more of operating systems 445, applications 450, virtual machines 455, hypervisor 460, and/or containers 465 may include instructions executable by processors 420. For example, in various embodiments, applications 450 may include instructions executable by one or more of processors 420 to perform any or all of the operations of method 200 illustrated in FIG. 2 or method 300 illustrated in FIG. 3, or to implement the functionality of any element of configurable services platform 150 or system 100 illustrated in FIG. 1A or 1B.

As discussed above, in various embodiments, main memory 440 may include any combination of non-volatile and/or volatile memory elements (not shown in FIG. 4). In one example, processor 420 may execute instructions of one or more of applications 450, virtual machines 455, hypervisor 460, and/or containers 465 via a non-volatile memory medium. In another example, one or more portions of the instructions of operating systems 445, applications 450, virtual machines 455, hypervisor 460, and/or containers 465 may be transferred to a volatile memory medium, and processor 420 may execute the one or more portions of the instructions of via the volatile memory medium.

In one or more embodiments, hypervisor 460 may include one or more of software, firmware, and hardware that creates and executes one or more virtual machines (e.g., one or more of virtual machines 455). For example, computer system 400 may be considered host machine when hypervisor 460 executes and one or more of virtual machines 455 are executed via hypervisor 460. For instance, a virtual machine (virtual machine) (e.g., a virtual machine of virtual machines 455) may be considered a guest machine.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS may behave and/or may appear like multiple different, individual computer systems. In various embodiments, one or more of containers 465 may be or include software in a file system that includes one or more of instructions executable by a processor (e.g., a program, software, an application, server software, a service, etc.), one or more runtime libraries, one or more system tools, and one or more system libraries, among others. In various embodiments, one or more of containers 465 may provide and/or may implement operating system-level virtualization via a virtual environment that includes a separate process space and/or a separate network space, rather than creating and/or implementing a virtual machine.

In one or more embodiments, I/O subsystem 430 may include or represent a variety of communication interfaces, graphics interfaces, video interfaces, user input interfaces, and/or peripheral interfaces, among others. For example, I/O subsystem 430 may include one or more of a touch screen, a display, a display adapter, and a universal serial bus (USB) interface, among others. For instance, a touch screen may include circuitry that enables touch functionality in conjunction with a display that is driven by a display adapter.

In one or more embodiments, network interface 410 may be configured to be coupled to a network. For example, network interface 410 may permit computer system 400 to be communicatively coupled to a network. In one instance, network interface 410 may be configured to be coupled to a wired network. In a second instance, network interface 410 may be configured to be coupled to a wireless network. In a second instance, network interface 410 may be configured to be coupled to an optical network.

In one or more embodiments, one or more of main memory 440, network interface 410, and I/O subsystem 430 may be communicatively coupled to processor 420 via one or more buses. For example, a bus may include one or more of a peripheral component interconnect (PCI) bus, a serial peripheral interface (SPI) bus, an inter-integrated circuit (I²C) bus, an enhanced serial peripheral interface (eSPI) bus, a system management bus (SMBus), a universal serial bus, and a low pin count (LPC) bus, among others. In one or more embodiments, one or more of main memory 440, network interface 410, and I/O subsystem 430 may be communicatively coupled to processor 420 via one or more of a PCI-Express (PCIe) root complex and one or more PCIe switches, among others.

In one or more embodiments, processor 420 may execute instructions in implementing one or more systems, flowcharts, methods, and/or processes described herein. In one example, processor 420 may execute processor instructions from main memory 440 in implementing one or more systems, flowcharts, methods, and/or processes described herein. These may include, by example and not limitation, method 200, method 300, user portal application 190, platform administration portal application 110, repository or service applications 160, configuration cache update system 155 (or any elements thereof), configuration driven service request processor 170 (or any elements thereof) or service request router 180. In another example, processor 420 may execute instructions received via network interface 410 in implementing one or more systems, flowcharts, methods, and/or processes described herein.

In one or more embodiments, processor 420 may include circuitry that may interpret and/or execute program instructions and/or process data, among others. For example, processor 420 may include one or more of a system, a device, and an apparatus that may interpret and/or execute program instructions and/or process data, among others. For instance, processor 420 may include one or more of a central processing unit (CPU), a microprocessor, a graphics processing unit (GPU), an application processor, a digital signal processor (DSP), and an application specific integrated circuit (ASIC), among others.

In some embodiments, the functionality of various elements of system 100 illustrated in FIGS. 1A and 1B may be implemented, collectively, by multiple computer systems, each of which may or may not be similar to computer system 400 illustrated in FIG. 4. Some of these computer systems may implement the functionality of a server that provides services on behalf of users, as brokered by configurable services platform 150, or portals through which users interact with system 100. Some of these computer systems may implement a repository to which service requests may be routed by configurable services platform 150 following definition of the service request through a user portal 190, submission of the services requests to configurable services platform 150, and processing by configurable services platform 150.

Figure 5:
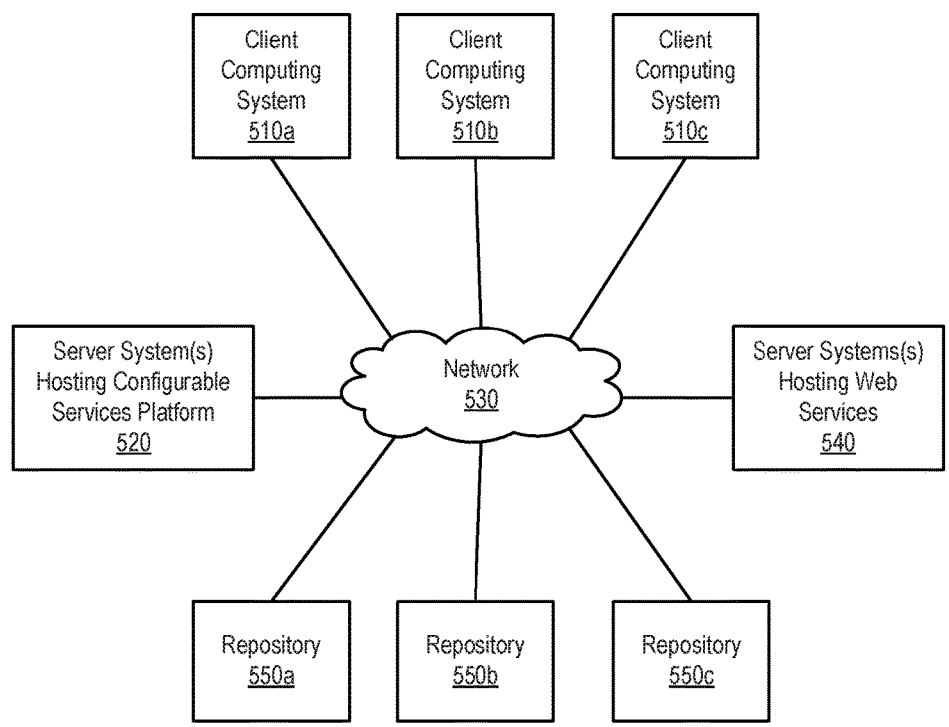
FIG. 5 illustrates an example of multiple computer systems coupled to a network, according to one or more embodiments.

For example, FIG. 5 illustrates multiple computer systems coupled to a network, according to one or more embodiments. These computer systems include three client computing systems 510, one or more server systems 520 that, collectively or individually, are configured to implement a configurable services platform (such as configurable services platform 150 illustrated in FIGS. 1A and 1B), one or more server systems 540 configured to host various web services, and three computing systems each configured to implement a respective content repository 550. In various embodiments, any or all of computer systems 510, 520, 540, and 550 may include elements similar to those of computer system 400 illustrated in FIG. 4. As shown, computer systems 510, 520, 540, and 550 may be communicatively coupled to a network 530. In one or more embodiments, network 530 may include one or more of a wired network, an optical network, and a wireless network. For example, network 530 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 530 may be coupled to one or more other networks. For example, network 530 may be coupled to one or more of a LAN, a WAN, a WLAN, a MAN, a PSTN, a public WAN, a private WAN, a cellular telephone network, a satellite telephone network, and a VPN, among others.

While several example systems described in the present disclosure involve service requests related to document management or operations on client content stored in multiple repositories on behalf of users in different client domains, in other embodiments, a configurable services platform may broker the fulfillment of other types of service requests on behalf of users in multiple domains in a system that provides other types of services. For example, a configurable services platform, such as those described in the present disclosure, may be implemented in any organization or enterprise environment in which there are multiple systems with which users in different functional organizations or lines of business (each of which may have different requirements and/or parameters for performing platform-supported operations) wish to interact without having to know the internal details of the systems. Incorporating the system and methods of the configurable services platform described herein, including the use of a configuration database to decouple configuration information from the code that that implements client-domain-specific user portals, services, or repositories, may simplify and improve on conventional processes for installing and managing software in these systems. The organizations or enterprises may thus benefit from the ability to on-board various client domains, services, or repositories without having to modify existing code prior to installation or perform certain software management tasks, such as performing maintenance or regression testing on the code, in response to changes in the configuration information or in the collection of client domain, services, and/or repositories supported in the system.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for installing and managing service software, comprising:
one or more computers, each comprising a respective processor, the processors collectively configured to execute program instructions to implement a plurality of services on behalf of users in one or more client domains;
a configurable services platform communicatively coupled to the one or more computers, the configurable services platform including:
a memory storing respective configuration information associated with each of the one or more client domains, the configuration information including, for each client domain, information defining one or more of an indexing key, a configuration attribute, or filtering criteria associated with service requests submitted on behalf of users in the client domain and targeting at least one of the plurality of services; and
a service request processor configured to process service requests received on behalf of the users in the one or more client domains and targeting respective ones of the plurality of services based on the configuration information stored in the memory and associated with each of the client domains, the processing including routing the service requests to the targeted services;
a platform administration portal communicatively coupled to the configurable services platform and configured to:
present a user interface through which the configuration information associated with each of the one or more client domains is input to the system by a platform administrator;
receive, through the user interface, input indicating a requested change in the configuration information associated with a given one of the client domains;
the configurable services platform further including a configuration object builder configured to create a configuration object including updated configuration information associated with the given client domain, the updated configuration information reflecting the requested change;
the configurable services platform further configured to push the configuration object to an application cache accessible by a given one of the plurality of services targeted by service requests submitted on behalf of users in the given client domain; and
the given one of the plurality of services configured to apply the configuration object in fulfilling the service requests submitted on behalf of users in the given client domain without modification of the program instructions executable to implement the given service.

2. The system of claim 1, wherein the requested change in the configuration information comprises the addition of a new indexing key or new filtering criteria to be supported in service requests submitted on behalf of users in the given client domain.

3. The system of claim 1, wherein:
the system further comprises a user portal through which users in the given client domain submit service requests, the user portal configured to present user interface elements for specifying values for an indexing key or filtering criteria defined in the configuration information stored in the memory and associated with the given client domain;
the configurable services platform is further configured to push the configuration object to an application cache accessible by the user portal; and
the user portal is configured to apply the configuration object pushed to the application cache accessible to the presentation of the user interface elements without a modification of program instructions executable to implement the user portal.

4. The system of claim 3, wherein the configurable services platform is configured to push configuration objects to the application cache accessible by the given service and to the application cache accessible by the user portal on a predetermined schedule or at predetermined intervals.

5. The system of claim 1, wherein:
the configurable services platform is communicatively coupled to each of the plurality of services through a predefined interface implemented in a connector between the configurable services platform and the service;
the platform administration portal is further configured to receive input indicating a request to add a new service; and
responsive to the request to add the new service, the configurable services platform is configured to:
build a new connector between the configurable services platform and the new service in accordance with the predefined interface; and
establish communication with the new service through the new connector.

6. The system of claim 5, wherein:
the configuration information includes, for each client domain, validation information indicating one or more validation rules to be applied to service requests submitted by users in the client domain or a service to be called to validate service requests submitted by users in the client domain;
the input indicating the request to add a new service includes information identifying which of the one or more client domains is associated with the new service; and
responsive to the request to add the new service, the configurable services platform is further configured to apply the validation information to service requests submitted by users in an identified client domain that target the new service.

7. The system of claim 1, wherein:
the one or more services include at least one repository configured to store content on behalf of users in the given client domain; and
an attribute defined in the configuration information stored in the memory and associated with the given client domain identifies the at least one repository.

8. The system of claim 1, wherein:
the one or more services include a repository configured to store content on behalf of users in the given client domain;
the system further comprises:
a user portal through which a user in the given client domain submits a service request targeting the repository; and
a service request router configured to route the service request to the repository;
the service request includes a request to perform a query on content stored in the repository on behalf of users in the given client domain or a request to retrieve content stored in the repository on behalf of users in the given client domain; and
the configuration information stored in the memory and associated with the given client domain includes an indexing key usable to access a particular content element within the content stored in the repository on behalf of users in the given client domain or filtering criteria usable to identify a portion of the content stored in the repository on behalf of users in the given client domain on which an operation specified in the service request is to be performed.

9. The system of claim 1, wherein:
the one or more services include a repository configured to store content on behalf of users in the given client domain;
the system further comprises:
a user portal through which a user in the given client domain submits a service request targeting the repository; and
a service request router configured to route the service request to the repository;
the service request specifies a lifecycle operation to be performed on a particular content element within the content stored in the repository on behalf of users in the given client domain.

10. An apparatus for installing and managing service software, comprising:
a memory storing respective configuration information associated with each of one or more client domains, the configuration information including, for each client domain, information defining one or more of an indexing key, a configuration attribute, or filtering criteria associated with service requests submitted to the apparatus on behalf of users in the client domain and targeting at least one of a plurality of services accessible through the apparatus;
a service request processor configured to process service requests received on behalf of the users in the one or more client domains and targeting respective ones of the plurality of services based on the configuration information stored in the memory and associated with each of the client domains, the processing including routing the service requests to the targeted services;
a platform administration portal configured to:
present a user interface through which the configuration information associated with each of the one or more client domains is defined;
receive, through the user interface, input indicating a requested change in the configuration information associated with a given one of the client domains;
a configuration object builder configured to create a configuration object including updated configuration information associated with the given client domain, the updated configuration information reflecting the requested change;
the apparatus configured to push the configuration object to an application cache accessible by a given one of the plurality of services targeted by service requests submitted on behalf of users in the given client domain, the configuration object usable to enable fulfillment of the service requests submitted on behalf of users in the given client domain, by the given service, in accordance with the updated configuration information associated with the given client domain without a modification of program instructions executable to implement the given service.

11. The apparatus of claim 10, wherein the requested change in the configuration information comprises the addition of a new indexing key or new filtering criteria to be supported in service requests submitted on behalf of users in the given client domain.

12. The apparatus of claim 10, wherein the apparatus is further configured to push the configuration object to an application cache accessible by a user portal through which users in the given client domain submit service requests to the apparatus, the configuration object usable by the user portal to populate one or more user interface elements of the user portal in accordance with an indexing key or filtering criteria defined in the configuration information stored in the memory and associated with the given client domain without a modification of program instructions executable to implement the given service.

13. The apparatus of claim 10, wherein:
the apparatus is communicatively coupled to each of the plurality of services through a predefined interface implemented in a connector between the apparatus and the service;
the platform administration portal is further configured to receive input indicating a request to add a new service; and
responsive to the request to add the new service, the apparatus is configured to:
build a new connector between the apparatus and the new service in accordance with the predefined interface; and
establish communication with the new service through the new connector.

14. The apparatus of claim 10, wherein:
the one or more services include at least one repository configured to store content on behalf of users in the given client domain; and
an attribute defined in the configuration information stored in the memory and associated with the given client domain identifies the at least one repository.

15. The apparatus of claim 10, wherein:
the one or more services include a repository configured to store content on behalf of users in the given client domain;
the apparatus is further configured to:
receive, on behalf of a user in the given client domain, a service request targeting the repository; and
route the service request to the repository;
the service request includes a request to perform a query on content stored in the repository on behalf of users in the given client domain, a request to retrieve content stored in the repository on behalf of users in the given client domain, or a request to perform a lifecycle operation on content within the content stored in the repository on behalf of users in the given client domain; and
the configuration information stored in the memory and associated with the given client domain includes an indexing key usable to locate the content on which the service request is to be performed or filtering criteria usable to identify a particular content element on which the service request is to be performed.

16. A method for installing and managing service software, comprising:
presenting a user interface through which respective configuration information associated with each of one or more client domains is defined, the configuration information including, for each client domain, information defining one or more of an indexing key, a configuration attribute, or filtering criteria associated with service requests submitted to a configurable services platform on behalf of users in the client domain and targeting at least one of a plurality of services accessible through the configurable services platform;
storing, in a memory, the respective configuration information associated with each of the one or more client domains;
processing, by the configurable services platform, service requests received on behalf of the users in the one or more client domains and targeting respective ones of the plurality of services based on the configuration information stored in the memory and associated with each of the client domains, the processing including routing the service requests to the targeted services;
receiving, through the user interface, input indicating a requested change in the configuration information associated with a given one of the client domains;
creating a configuration object including updated configuration information associated with the given client domain, the updated configuration information reflecting the requested change;
pushing the configuration object to an application cache accessible by a given one of the plurality of services targeted by service requests submitted on behalf of users in the given client domain;
applying, by the given service, the configuration object in fulfilling the service requests submitted on behalf of users in the given client domain without a modification of program instructions executable to implement the given service.

17. The method of claim 16, further comprising:
pushing the configuration object to an application cache accessible by a user portal through which users in the given client domain submit service requests to the configurable services platform;
populating, by the user portal, one or more user interface elements of the user portal in accordance with an indexing key or filtering criteria defined in the configuration information stored in the memory and associated with the given client domain without a modification of program instructions executable to implement the user portal.

18. The method of claim 16, wherein:
the configurable services platform is communicatively coupled to each of the plurality of services through a predefined interface implemented in a connector between the configurable services platform and the service; and
the method further comprises:
receiving input indicating a request to add a new service; and
in response to receiving the request to add the new service:
building a new connector between the configurable services platform and the new service in accordance with the predefined interface; and
establishing communication with the new service through the new connector.

19. The method of claim 16, wherein the requested change in the configuration information comprises the addition of a new indexing key or new filtering criteria to be supported in service requests submitted on behalf of users in the given client domain.

20. The method of claim 16, wherein:
the one or more services include a repository configured to store content on behalf of users in the given client domain;
the method further comprises:
receiving, on behalf of a user in the given client domain, a service request targeting the repository;
routing the service request to the repository;
the service request includes a request to perform a query on content stored in the repository on behalf of users in the given client domain, a request to retrieve content stored in the repository on behalf of users in the given client domain, or a request to perform a lifecycle operation on content within the content stored in the repository on behalf of users in the given client domain;

the configuration information stored in the memory and associated with the given client domain includes an indexing key usable to locate the content on which the service request is to be performed or filtering criteria usable to identify a particular content element on which the service request is to be performed.

* * * * *